United States Patent
Sharma et al.

(10) Patent No.: US 9,132,405 B2
(45) Date of Patent: Sep. 15, 2015

(54) METHOD OF SYNTHESIZING SILICA NANOFIBERS USING SOUND WAVES

(71) Applicant: UT-Battelle, LLC, Oak Ridge, TN (US)

(72) Inventors: Jaswinder K. Sharma, Oak Ridge, TN (US); Panos G. Datskos, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 89 days.

(21) Appl. No.: 14/178,648

(22) Filed: Feb. 12, 2014

(65) Prior Publication Data

US 2015/0224468 A1 Aug. 13, 2015

(51) Int. Cl.
*B01J 19/10* (2006.01)
*C01B 33/12* (2006.01)
*C01B 33/023* (2006.01)

(52) U.S. Cl.
CPC ............... *B01J 19/10* (2013.01); *C01B 33/023* (2013.01); *C01B 33/12* (2013.01)

(58) Field of Classification Search
CPC ......... B01J 19/10; C01B 33/12; C01B 33/023
USPC ................................................. 423/335–340
See application file for complete search history.

(56) References Cited

U.S. PATENT DOCUMENTS

| 6,438,998 B1 | 8/2002 | Oh et al. | |
|---|---|---|---|
| 6,692,715 B2 * | 2/2004 | Barbeau | 423/335 |
| 2011/0159286 A1 * | 6/2011 | Park et al. | 428/390 |

FOREIGN PATENT DOCUMENTS

| CN | 101413211 | 4/2009 |
|---|---|---|
| CN | 102120585 | 7/2011 |
| CN | 102259871 | 12/2012 |
| CN | 103224239 | 7/2013 |
| WO | 2012/134086 | 10/2012 |

* cited by examiner

Primary Examiner — Anthony J Zimmer
(74) Attorney, Agent, or Firm — Warner Norcross & Judd LLP

(57) ABSTRACT

A method for synthesizing silica nanofibers using sound waves is provided. The method includes providing a solution of polyvinyl pyrrolidone, adding sodium citrate and ammonium hydroxide to form a first mixture, adding a silica-based compound to the solution to form a second mixture, and sonicating the second mixture to synthesize a plurality of silica nanofibers having an average cross-sectional diameter of less than 70 nm and having a length on the order of at least several hundred microns. The method can be performed without heating or electrospinning, and instead includes less energy intensive strategies that can be scaled up to an industrial scale. The resulting nanofibers can achieve a decreased mean diameter over conventional fibers. The decreased diameter generally increases the tensile strength of the silica nanofibers, as defects and contaminations decrease with the decreasing diameter.

9 Claims, 3 Drawing Sheets

METHOD OF SYNTHESIZING SILICA NANOFIBERS USING SOUND WAVES

This invention was made with government support under Contract No. DE-AC05-00OR22725 awarded by the U.S. Department of Energy. The government has certain rights in the invention.

BACKGROUND OF THE INVENTION

The present invention relates to a method of synthesizing nanofibers, and in particular silica nanofibers.

High performance fibers are of special interest in applications involving lightweight materials, armored materials, and materials adapted to withstand extreme environments. In the past five decades, various high performance fibers have been synthesized and commercialized. These fibers include silica fibers, carbon fibers, and polymer fibers. High performance fibers are generally characterized by tensile strength, weight, chemical reactivity, production cost, and the availability of raw materials. The following table provides a general overview of many such properties of various high performance fibers, with theoretical values illustrated in parentheses:

| Property | Silica | Carbon | Polymer | High Strength Steel |
|---|---|---|---|---|
| Tensile Strength (GPa) | 10 (30) | 10 (100) | 3.5 | 2.8 |
| Cost ($/lb) | 1 | 13 | 10 | 1 |
| Density (g/cm$^3$) | 2.5 | 1.8 | 1.5 | 7.8 |
| Transparency | Yes | No | No | No |
| Thermal Stability (° C.) | 1200-1600 | 1600-2000 | 150 | 700 |

As shown in the above table, existing carbon fibers have high tensile strength (10 GPa) and low reactivity, but energy intensive, time consuming, and highly expensive synthesis and low recyclability has limited their use to high-end applications. Similarly, polymer fibers are limited by their low tensile strength, degradability, and high cost. Steel fibers are inexpensive but weight and low tensile strength is a disadvantage. Among these high performance fibers, silica fibers have gained a considerable interest because of the potential for 1) large scale production, 2) an abundance of precursors, 3) low manufacturing costs, 4) a 30 GPa theoretical tensile strength, 5) transparency, and 6) easy recyclability. Accordingly, there remains a continued need for improved manufacturing methods for the scalable production of silica fibers, including nanofibers, across a range of applications and operating conditions.

SUMMARY OF THE INVENTION

Methods for synthesizing oxide nanofibers, for example silica nanofibers, using sound waves are provided. The method generally includes forming a polymer-based solution, adding an oxide-based compound to the polymer-based solution to form a reaction mixture, and sonicating the reaction mixture for a period of time sufficient to synthesize oxide nanofibers having a diameter less than 70 nm, optionally about 30 nm. Subsequently, these oxide nanofibers can be converted into a metal or a semiconductor. For example, one mechanism for the conversion of $SiO_2$ nanofibers to crystalline silicon includes interacting $SiO_2$ nanofibers with magnesium metal (Mg) or coke (C) to remove oxygen from the $SiO_2$ nanofibers, leaving crystalline silicon.

According to one embodiment, a method for synthesizing silica nanofibers includes providing a solution of polyvinyl pyrrolidone, adding constituents to the solution including sodium citrate and ammonium hydroxide before homogenizing the solution, adding a silica-based compound to the homogenized solution to form a reaction mixture, and sonicating the reaction mixture to synthesize a plurality of silica nanofibers in a bath sonicator.

According to another embodiment, the solution of polyvinyl pyrrolidone includes polyvinyl pyrrolidone dissolved in pentanol with a molar concentration of between 0.4 mM to 3.0 mM. The constituents include water (~1.34 M), sodium citrate (~1.54 mM), ethanol (~1.38 M), and ammonium hydroxide (~0.25 M). Tetraethyl orthosilicate (~38 mM) is added after an initial sonication to homogenize the mixture of polymer-based solution and constituents. The resulting reaction mixture is further sonicated for a period greater than 30 minutes while at room temperature to synthesize silica nanofibers having the desired mean cross-sectional diameter and length.

The above embodiments are generally free from the steps of heating or electrospinning, and instead include less energy intensive sonication strategies that can be scaled up to an industrial scale. The resulting nanofibers can achieve a decreased mean diameter over conventional fibers. The decreased mean diameter generally increases tensile strength, which is expected to achieve a tensile strength greater than many existing fibers, as defects and contaminations generally decrease with the decreasing diameter.

These and other features and advantages of the present invention will become apparent from the following description of the invention, when viewed in accordance with the accompanying drawings and appended claims.

DETAILED DESCRIPTION OF THE CURRENT EMBODIMENTS

The invention as contemplated and disclosed herein includes methods for synthesizing oxide nanofibers, for example silica nanofibers and titania nanofibers, using sound waves. As set forth more fully below, the method involves the sonication of a reaction mixture, resulting in oxide nanofibers having a diameter less than 70 nm, optionally about 30 nm. The oxide nanofibers are expected to have a tensile strength greater than many existing fibers. As used herein, "nanofiber" refers to continuous filaments having a mean diameter of less than about 100 nm, optionally defining a circular cross-section along their length.

Figure 1:
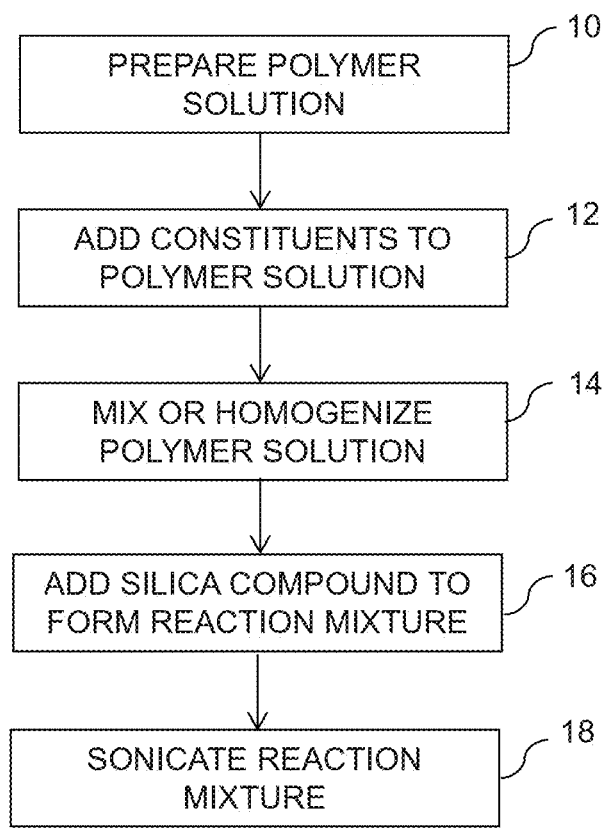
FIG. 1 is a flow chart illustrating silica nanofiber formation in accordance with an embodiment of the present invention.

Referring now to FIG. 1, a flow chart illustrating silica nanofiber formation is presented. In general terms, a method for preparing silica nanofibers in accordance with one embodiment can include the following steps or stages: a) preparing a solution including an amphiphilic polymer, b) adding constituents (e.g., water, sodium citrate, ethanol, and ammonium hydroxide) to the solution of amphiphilic polymer, c) mixing the solution to homogenize the constituents, for example sonication or stifling, d) adding a silica-based compound to the sonicated/stirred solution to form a reaction mixture, e) sonicating the reaction mixture for a desired period of time to synthesize a plurality of silica nanofibers having an average cross-sectional diameter of less than 70 nm and having a length on the order of at least several hundred microns. While described as relating to silica nanofibers, the method can be modified for other oxide nanofibers. For example, the method can be modified at step d) to include a titania-based compound in place of the silica-based compound, thereby forming titania nanofibers.

Preparing a solution including an amphiphilic polymer is depicted as step 10 in FIG. 1. This step generally includes dissolving an amphiphilic polymer in alcohol, for example pentanol. The amphiphilic polymer can include for example polyvinyl pyrrolidone (PVP) in some embodiments, while in other embodiments the amphiphilic polymers can optionally include polyethylene glycol (PEG), polyoxy ethylene (POE), polyethylene oxide (PEO), and combinations thereof. Alternative solvents to pentanol can include hexanol and heptanol for example. PVP can be dissolved at room temperature, where the resulting solution includes PVP with a molar concentration between about 0.4 mM and about 6.0 mM inclusive, optionally between about 1.0 mM and about 4.0 mM inclusive, and further optionally between about 1.5 mM and about 3.0 mM inclusive. In one embodiment, between 0.6 g of PVP and 1.25 g of PVP can be dissolved in 10 ml of pentanol, corresponding to a concentration of between 1.25 mM and 2.60 mM.

Adding constituents to the solution of PVP is depicted as step 12 in FIG. 1. This step generally includes adding an effective amount of water, sodium citrate, ethanol, and ammonium hydroxide to form a mixture. The mixture can include a molar concentration of water between about 1.20 M to about 1.50 M, optionally about 1.34 M. The mixture can also include about a molar concentration of sodium citrate of about 0.5 mM to about 2.5 mM, optionally about 1.54 mM; a molar concentration of ethanol of about 0.5 M to about 2.5 M, optionally about 1.38 M; a molar concentration of ammonium hydroxide of about 0.1 M to about 1.0 M, optionally about 0.25 M. Other constituents can be added in other embodiments where desired. For example, methanol can be substituted for ethanol, water soluble amines can be substituted for ammonium hydroxide, and water soluble ligands can be substituted for sodium citrate.

Mixing the constituents in the solution is depicted as step 14 in FIG. 1. This step can include sonicating, stifling, shaking or vortexing the above mixture for a period on the order of several minutes to homogenize the mixture. For example, sonication can last from about one minute to about ten minutes inclusive, further optionally from about two minutes to about eight minutes inclusive, and still further optionally about five minutes. Where sonication is used, a suitable sonicating unit can include any sonicator employing acoustic energy, for example a bath sonicator or a microtip sonicator. An example bath sonicator includes a Branson 2510 ultrasonicator, and an example microtip sonicator includes a Branson 450 ultrasonicator, both from Branson Ultrasonics Co., Danbury, Conn. Sonication can occur at room temperature in the present embodiments, optionally at a power setting of 100 Watts (Branson 2510). Where sonication is not used, the constituents can be mixed by stifling, shaking, or vortexing, for example.

Adding a silica-based compound (or a titania-based compound for titania nanofibers) to the sonicated mixture to form a reaction mixture is depicted as step 16 in FIG. 1. The silica-based compound includes tetraethyl orthosilicate (TEOS) for example. In embodiments using TEOS, the resulting reaction mixture can include TEOS with a molar concentration of about 20 mM to about 60 mM, optionally about 30 mM to about 50 mM, further optionally about 38 mM. The molar concentration of silica-based compound can differ within or outside of these ranges, however. Where titania nanofibers are formed, the titania-based compound can include titanium ethoxide or titanium isopropoxide, for example.

A second sonicating step is depicted as step 18 in FIG. 1. This step generally includes sonicating the reaction mixture for a period of at least thirty minutes, while optionally at room temperature. A suitable sonicator can optionally include the same sonicating unit employed at step 14 above. In other embodiments a different sonicator is utilized, for example in batch or continuous processing. Where the Branson 2510 bath sonicator is utilized, the sonicator can be operated at 100 Watts for a sonication period sufficient to allow silica nanofibers to synthesize. The sonication period can be on the order of several hours in the present embodiment, optionally between about one hour and about ten hours, further optionally about four hours. The sonication period can vary within or outside of these ranges in other embodiments as desired. The resulting silica nanofibers can include an average diameter not more than 70 nm, optionally between 30 and 70 nm inclusive, further optionally approximately 30 nm. The resulting silica nanofibers can include an average length of at least several hundred microns. Silica nanofibers according to the present invention are expected to achieve a tensile strength greater than 10 GPa, optionally as great as 30 Gpa.

The above method steps are described as proceeding substantially at room temperature and without intervening standing or setting steps. Standing or setting steps appeared to have no impact on nanofiber synthesis, which predominates throughout sonication of the reaction mixture at step 18. In other embodiments, however, one or more standing/setting steps can be introduced between any of steps 10 through 18. Additional steps can also be added to the foregoing as desired, including steps involving the extraction, drying, rinsing and sorting of silica nanofibers for composites, ballistics, filters, textiles, adsorbents, and other applications. In addition, the silica nanofibers can be converted into a metal or a semiconductor. For example, silica nanofibers can be converted to crystalline silicon by interacting silica nanofibers with magnesium metal (Mg) or coke (C) to remove oxygen from the silica nanofibers, leaving crystalline silicon.

Example 1

Silica nanofibers were synthesized according to the following example, which is intended to be non-limiting.

Figure 2:
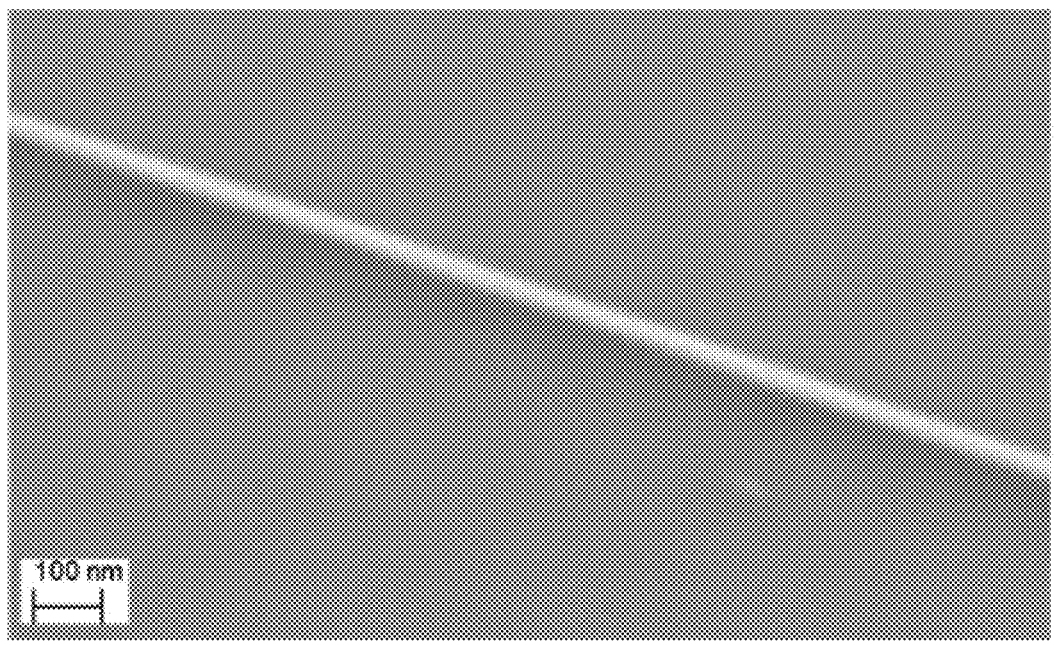
FIG. 2 is a SEM micrograph of a silica nanofiber formed according to an embodiment of the present invention.
Figure 3:
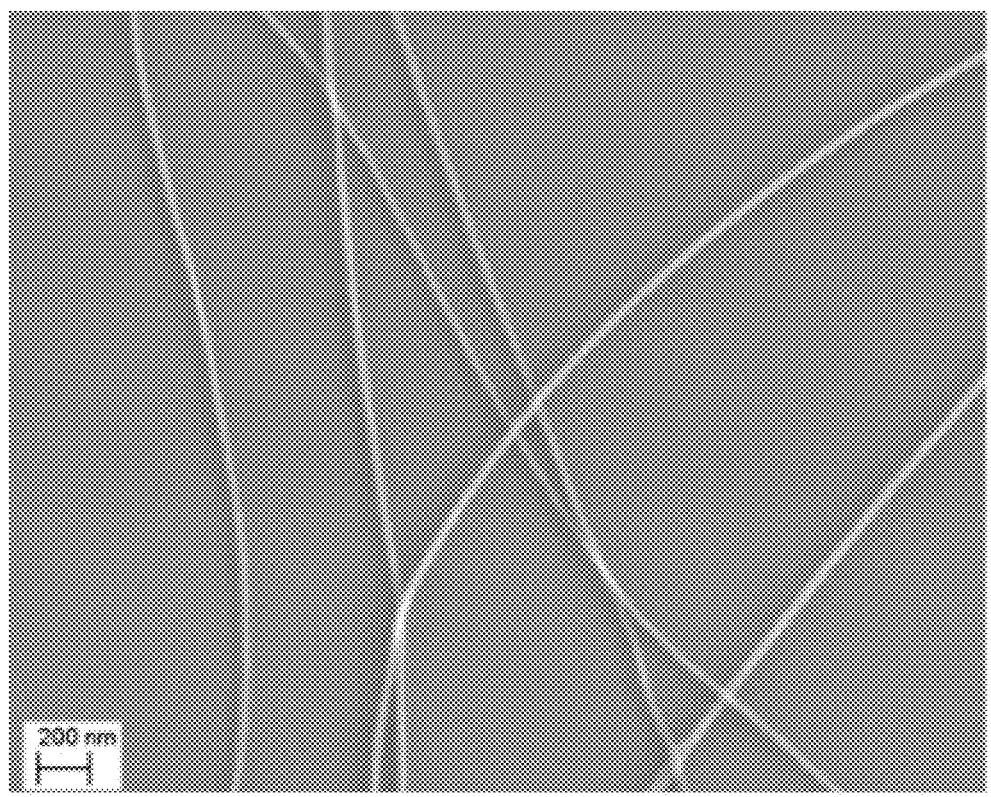
FIG. 3 is a SEM micrograph of silica nanofibers formed according to an embodiment of the present invention.

A solution of polyvinyl pyrrolidone was obtained by dissolving 0.5 g of polyvinyl pyrrolidone in 5 ml of pentanol at room temperature. The following were added to the solution of polyvinyl pyrrolidone: 140 µl of deionized water, 50 µl of sodium citrate (0.18 M), 475 µl of ethanol, and 100 µl of ammonium hydroxide. This mixture (having a pH of about 10) was sonicated in a Branson 2510 bath sonicator at a power setting of 100 Watts for 5 minutes. Tetraethyl orthosilicate (50 µl) was added to the sonicated mixture at room temperature. The resulting reaction mixture was further sonicated for 4 hours in the Branson 2510 bath sonicator at 100 Watts to promote silica nanofibers synthesis. Synthesized silica nanofibers demonstrated an average diameter of approximately 30 nm and an average length of several hundred microns. Scanning Electron Microscope (SEM) micrographs of silica nanofibers formed according to the present example are shown in FIGS. 2-3.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method of forming silica nanofibers comprising:
adding water, sodium citrate, ethanol, and ammonium hydroxide to a solution of polyvinyl pyrrolidone to form a first mixture;
adding tetraethyl orthosilicate to the first mixture to form a second mixture; and
sonicating the second mixture to synthesize a plurality of silica nanofibers having an average cross-sectional diameter of not more than 70 nm.

2. The method according to claim 1 wherein the solution of polyvinyl pyrrolidone includes a concentration of 1.25 mM to 2.60 mM polyvinyl pyrrolidone.

3. The method according to claim 1 wherein the first mixture includes a molar concentration of sodium citrate between 0.5 mM and 2.5 mM.

4. The method according to claim 1 wherein the first mixture includes a molar concentration of ethanol between 0.5 M and 2.5 M.

5. The method according to claim 1 wherein the first mixture includes a molar concentration of ammonium hydroxide between 0.1 M and 1.0 M.

6. The method according to claim 1 wherein the second mixture includes a molar concentration of tetraethyl orthosilicate between 20 mM to 60 mM.

7. The method according to claim 1 wherein sonicating the second mixture is performed at room temperature.

8. The method according to claim 1 wherein sonicating the second mixture includes applying ultrasound energy to the reaction mixture for greater than one hour.

9. The method according to claim 1 wherein sonicating the second mixture includes sonicating the reaction mixture in a sonicating bath.

* * * * *